Jan. 7, 1964  N. A. PENNINGTON  3,116,612
AIR CONDITIONING BY EVAPORATIVE PAD MEANS
Filed Jan. 2, 1962  3 Sheets-Sheet 1

INVENTOR.
Neal A. Pennington
BY
John J. McLaughlin
Attorney

Jan. 7, 1964 N. A. PENNINGTON 3,116,612
AIR CONDITIONING BY EVAPORATIVE PAD MEANS
Filed Jan. 2, 1962 3 Sheets-Sheet 3
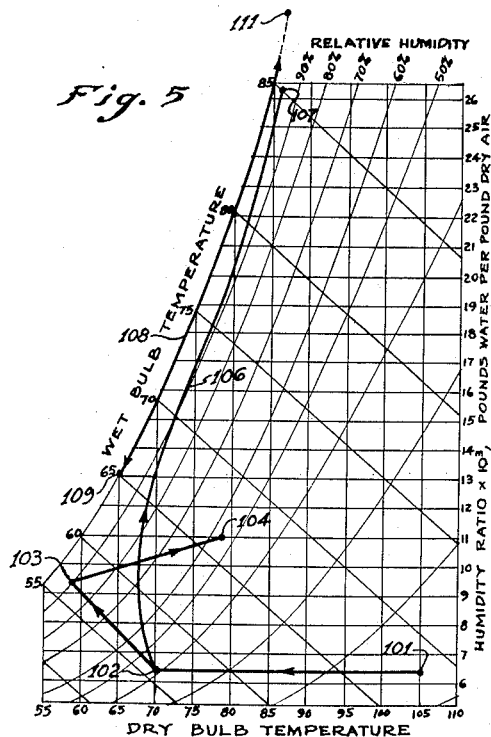
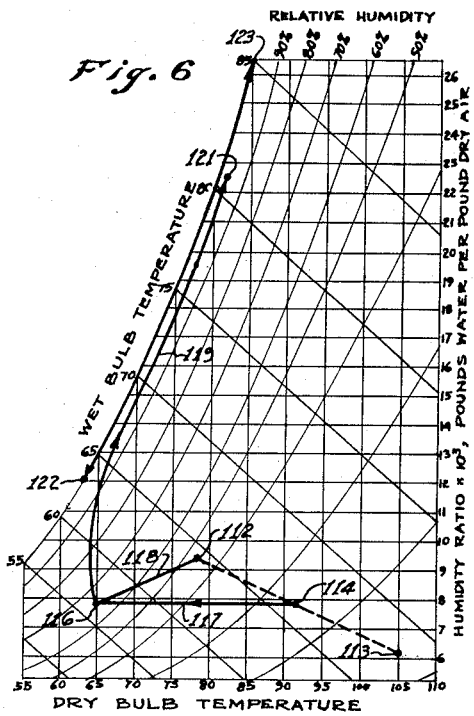
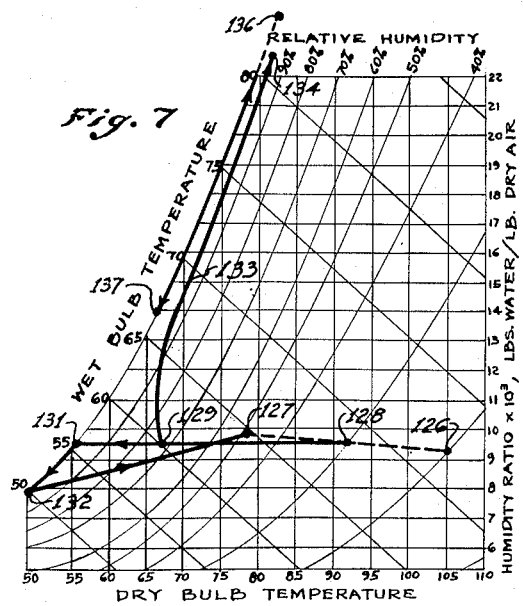
INVENTOR.
Neal A. Pennington
BY
John J. McLaughlin
Attorney

United States Patent Office 3,116,612
Patented Jan. 7, 1964

3,116,612
AIR CONDITIONING BY EVAPORATIVE
PAD MEANS
Neal A. Pennington, 1402 N. Swan Road, Tucson, Ariz.,
assignor of twenty-five percent to John J. McLaughlin,
Scottsdale, Ariz., and twenty-two and one-half percent
to Lawrence A. McKinney, Tucson, Ariz.
Filed Jan. 2, 1962, Ser. No. 163,715
9 Claims. (Cl. 62—171)

My invention relates to a new and improved method of refrigerating living space or the like, and apparatus with which the method can be practised. My invention also contemplates specific improvement in the apparatus with which the method may be practised, although some of such improvements may also have general utility.

The commonest method and apparatus for reducing the temperature of living space and the like during the warmer months, commonly called air-conditioning methods and apparatus, involve the use of a refrigerant, means for compressing the refrigerant, means for removing heat from the compressed refrigerant, and a cooling coil into which the compressed refrigerant is expanded and vaporized. This coil is commonly called an expansion coil or refrigerating coil and the room space is cooled by blowing air across such coil and discharging the air through a duct system involving various outlets in various locations in the living space. Because of the cost of operating this type of refrigerating system, it is the common practice to re-circulate most if not all of the room air, so that precautions must be taken to avoid building up to excessive moisture in the air system. Moisture is normally removed by cooling the air at the refrigerating coil to the dew point or below and removing the resulting condensate.

In regions of low relative humidity and low wet bulb temperature such as the southwestern part of the United States, so-called evaporative coolers have gone into rather extensive use. For the most part evaporative coolers provide for no re-circulation of air whatsoever, the outside relatively dry air being brought in at a relatively high rate of speed and passed through moist pads to thereby cool the air adiabatically; that is to say, to reduce the sensible heat as shown by the dry bulb thermometer and increase the latent heat as shown by the wet bulb thermometer. The sensibly cooler air that has entered the living area replaces the room air which is vented through slightly open windows or doors in various parts of the house to provide uniform distribution of replacement air. There are very many advantages in the use of evaporative cooling, particularly in initial cost, since the system is simple and requires no appreciable duct work and no returns. The actual operating costs are low because, generally speaking, the water and power required to operate an evaporative cooler together cost much less than the power required to operate a refrigeration system.

Evaporative coolers are known to have certain disadvantages and limitations. For one thing, there is no reduction of total heat and there are circumstances under which this fact becomes discernible. The evaporative cooler also introduces amounts of additional moisture into the air but, of course, no build-up of moisture such as caused by re-circulation. There are times when the actual moisture in the system introduced by evaporative cooling may be too great for comfort, particularly during periods of relatively high humidity such as is encountered at certain times even in the most arid areas. There may be only a very few days in arid areas where the moisture of the air will be high enough to bring discomfort, but in borderline areas the total percentage of time during which unduly high humidities will be encountered may be great enough to make the use of straight evaporative systems undesirable or even inoperative.

In several prior art patents, of which my prior patent No. 2,464,766 may be considered as illustrative, I have disclosed apparatus for overcoming some of the disadvantages of an evaporative system, such, for example, as by the use of a rotating heat exchanger which permits the reduction of the sensible heat of the incoming air without concomitant increase of the latent heat with the accompanying increase in humidity. While my patented apparatus offers many advantages over the use of straight evaporative coolers, it tends nevertheless to have some limitation in its actual use, such, for example, as relatively high cost of initial installation as contrasted with a simple evaporative cooler. Evaporative coolers are sometimes provided with blowers operating at two speeds in an attempt to meet this problem, but only with partial success. The advantage of the refrigerant system—and this may be taken as an apparent disadvantage of the evaporative system—is that with the refrigerant system the temperature of the cooling coil is in general relatively independent of the outside temperature and humidity conditions. To be sure, refrigerant air conditioning systems commonly employ an air-cooled compressor which is somewhat affected by the temperature and humidity conditions of the ambient outside air, but the overall effect is negligible in the actual working of the system.

The principal object of my invention is the provision of an improved air conditioning system, using indirect evaporation of water.

Another object is the provision of an improved evaporative air conditioning system in which the air entering the room may be controlled to a temperature lower than the ambient wet bulb temperature.

Still another object of my invention is the provision of an evaporative air conditioning system in which the total amount of moisture entering a room is reduced, as contrasted with evaporative systems of the prior art providing the same theoretical cooling capacity.

A further object of my invention is the provision of an evaporative air conditioning system providing adequate cooling capacity at times and in locations heretofore not susceptible to satisfactory cooling by evaporative means.

Other specific objects and features of my invention will be apparent from the following detailed description taken with the accompanying drawings, wherein:

FIG. 5 is a psychrometric chart identifying temperature characteristics of both the air and water as they move through the system shown in FIG. 1;

FIG. 6 is a similar phychrometric chart showing the air and water temperatures at various points in the system when the system of FIG. 4 is used without its refrigeration coil, but not including any illustrative data, and FIG. 7 is a psychrometric chart showing illustrative air temperatures when the refrigerant cooled finned cooling coil is employed in the FIG. 4 system.

Figure 1:
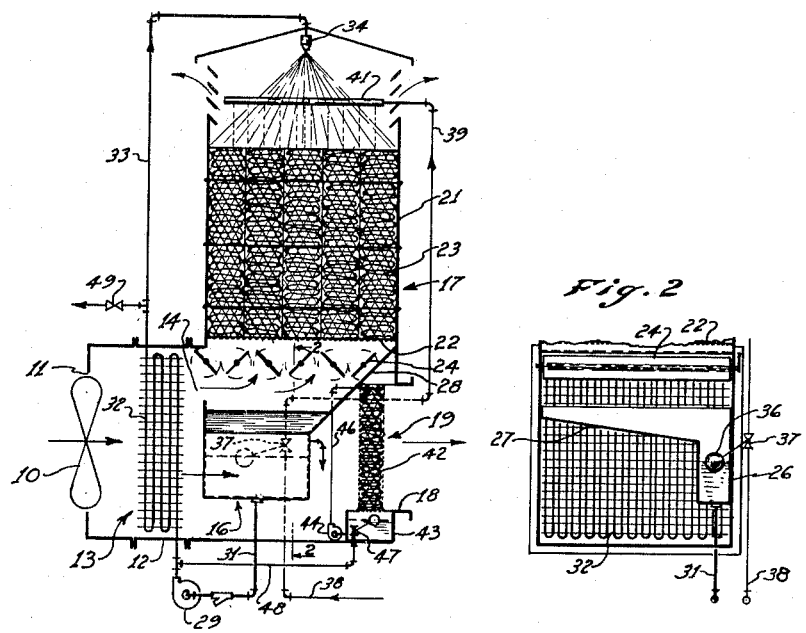
FIG. 1 is a schematic view showing the relative arrangement of the parts of apparatus with which my present method may be practised.
Figure 2:
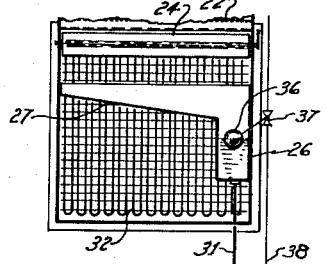
FIG. 2 is a sectional view taken on the line 2—2 of FIG. 1 looking in the direction of the arrows.
Figure 3:
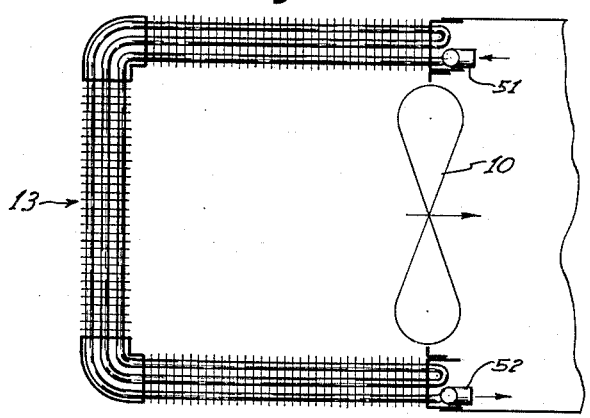
FIG. 3 is a plan view partly schematic showing one arrangement of the water-cooled finned cooling coil.

Referring now first to FIGS. 1 through 3, the apparatus there shown schematically may be produced by utilizing conventional internal duct and air directing structural means common to the industry. Outside air is moved by a blower 10 through an opening 11 and into an internal duct 12 forming part of the equipment and supported on a suitable base and frame (not shown). The incoming air passes through a water-cooled finned cooling coil 13 and into a chamber 14. The chamber 14 contains a sump indicated generally by the reference character 16 which divides the chamber into an upper chamber positioned between the sump and a tower indicated generally by the reference character 17; and a lower chamber communicating with an exhaust passageway 18 within which an evaporative pad assembly 19 is supported. As will be explained, part of the air moved by blower 10 moves upwardly through the tower 17 and a part through the evaporative pad assembly 19 and through the passageway 18 into the room.

The tower 17 is preferably in cross-section with imperforate side walls 21, a generally open top and an apertured bottom 22 functioning as a support for a plurality of cooling pads 23 which may be of the conventional type used in evaporative air conditioning systems. The apertured bottom 22 may suitably be relatively large mesh hardware cloth. Below the tower and at the top of the chamber 14 I provide a plurality of adjustable louvres 24 to furnish a measure of control over the amount of air moving upwardly through the tower. All of the equipment shown in FIG. 1, including the tower, is normally placed outside the building, but whether inside the building or outside the building, the air passing upwardly through the tower is vented to atmosphere. Thus, by passing air upwardly through the tower and wetting the pads 23 by water introduced from above, I provide a counter-current flow of air and water such as to obtain the maximum cooling effect of the water as it moves downwardly and finally settles into the sump 16.

Referring now to the water system and particularly to the structure of the sump 16, such sump comprises a water receiving receptacle 26, and a communicating false bottom 27 off the tower which catches the effluent cold water and delivers it into the sump proper 26. A slanting watershed 28 extends over to one side wall 21 so as not only to catch all of the water dripping from the tower, but also to positively close off the upper chamber at this point from the bottom chamber which is in communication with the evaporative pad 19.

Cold water is continuously drawn from the sump proper 26 by a pump 29 through a pipe 31 and delivered through the coil portion 32 of the finned cooling coil to a riser 33 and to a spray head 34 shaped to deliver water uniformly to the top of the tower and onto the top edge of the pads 23.

The level of the water in the sump proper 26 is controlled by a float 36 and float valve 37. When float valve 37 is opened it passes supply water from a main 38 to a riser 39 and thence to a perforated ring 41 for uniform disposal to the top edges of the pads 23. The advantage of delivering make-up water in this manner will be pointed out in connection with a description of the apparatus.

The evaporative pad assembly 19 includes a usual type of evaporative pad suitably supported to pass the maximum amount of air as by means of hardware cloth supports indicated schematically at 42 and a supporting bottom screen permitting water to drain from the bottom directly into a sump 43. From the sump 43 water is drawn by a pump 44 for delivery to the top of the pad through a pipe 46. The delivery of make-up water to the sump 43 is controlled by a float valve 47 which withdraws cold water from the cold water line near the coil 32 through a pipe 48.

Every water system employing a commercial water supply requires some draining of the system to bleed off water to reduce scaling within the cooling coil. In the present system I supply a bleeder valve 49 between the cooling coil 13 and the spray nozzle 34. This arrangement provides for maximum speed of water through the coil and secures other advantages, particularly the removal of water at its warmest temperature rather than at a point after it has been chilled in the tower.

The water-cooled finned cooling coil 13 is preferably so constructed and arranged as to provide a counter-current flow of air and cool water, such that the coolest air passes into contact with the coolest part of the coil. Illustratively in FIG. 3 I show a coil inlet 51 delivering maximum chilled water to the innermost row of the U-shaped coil structure, and an outlet 52 which, of course, would thereby deliver the heated water to the riser 33. Movement of air is in the direction of the arrow associated with the blower 10, and air can move into the chamber-like area comprising the space between the blower and the coil by moving through from three directions comprising the web and legs of the U. Regardless of which part of the finned cooling coil the air passes through, it always passes first into contact with the outer row which, although much cooler than the outside air, is still relatively the warmest of the rows of the coil system. Illustratively I show three individual rows of coils, but it is to be understood that the number may be markedly increased. As air moves from one coil layer to another it continuously encounters a cooler portion until it comes into contact with the innermost row, which has just received cold water from the entrance 51. The U-shaped coil furnishes the greatest cross-sectional area through which the air may move, as compared to the cross-sectional area presented to water flow. It is very important in the present invention that the ratio of air flow cross-section to water flow cross-section be as large as possible, so that small quantities of water can be made to flow rapidly through the coil. Tower effectiveness depends on low water volume, while coil effectiveness depends on rapid water flow. The U-shaped coil is one effective way to optimize both of the stated factors at the same time. It is essential in the practice of my present invention that the arrangement of the coil, the over-all surface exposed to the air, and the relative speed at which the air moves across the coil be such as to extract the maximum amount of heat from the coil, as will be explained by reference to the psychrometric charts.

Figure 4:
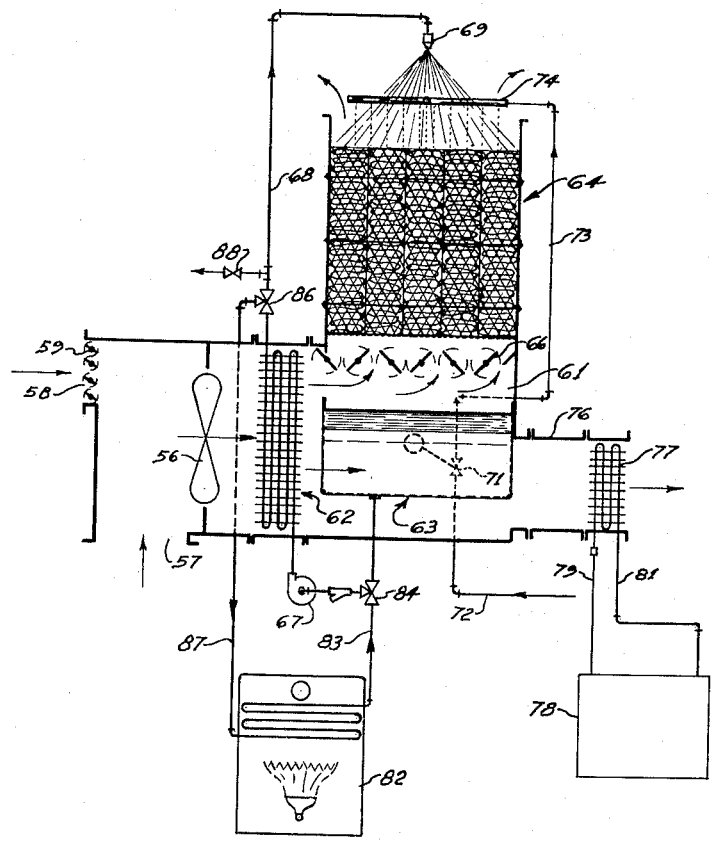
FIG. 4 is a view similar to FIG. 1, but indicating the manner in which the heating unit and refrigerant type cooling coil may be associated with the apparatus of the present invention in an installation calling for the re-circulation of part of the room air.

Before discussing the operation of the FIG. 1 system in detail and FIG. 5 in connection therewith, reference will first be made to FIG. 4 showing a system generally similar to that shown in FIG. 1 but where a portion of the room air is re-circulated. In the system shown in FIG. 4 a blower 56 withdraws room air through a passageway 57 and mixes it with outside air 58 withdrawn from the outside through adjustable louvres 59. The mixed room air and outside air in suitable proportions such, for example, as seventy-five units of room air to seventy-five units of outside air, is delivered by the blower 56 into chamber 61 through a water-cooled finned cooling coil 62. The chamber 61, as in the previous embodiment, is divided into upper and lower chambers with a water supply sump 63. A portion of the air is delivered upwardly through a tower 64, which may have the same general configuration and functional characteristics of the tower described in connection with FIG. 1. Adjustable louvres 66 control the proportion of air delivered to the tower. Water is drawn from the sump 63 by a pump 67, delivered through the water-cooled finned cooling coil 62, thence through riser 68 and to a spray head 69. Make-up water controlled by a float valve 71 is delivered from a commercial water line 72 to a riser 73 and thence to a perforated ring 74 for delivery to the upper part of the tower.

The system shown in FIG. 4 has an outlet 76 from chamber 61 into the room, and a refrigerant-cooled finned cooling coil 77 is placed in such outlet in the event it is desired to further cool and/or de-humidify the air. A small air conditioning unit 78 comprising a compressor and condenser delivers cooled refrigerant in compressed form through a tube 79 to the coil 77, and receives the expanded refrigerant from coil 77 through a larger suction line 81. The coil 77 and compressor unit 78 and connecting lines are for all practical purposes standard in their construction, but the installation is supplemental, as will be described, and carries only part of the load when temperature and humidity conditions require it.

The system shown in FIG. 4 may also utilize a water-heating furnace 82, delivering hot water through line 83 to the finned coil 62 and receiving return water through a three-way valve 86 and return line 87. The system of FIG. 4, like the system of FIG. 1, has a bleeder valve 88 for the purpose of reducing scale.

It will thus be seen that FIG. 4 may be considered as showing several systems. The system of FIG. 4, without the refrigerating coil, would usually be balanced and engineered somewhat differently than if it contained a refrigeration coil. The system may or may not utilize a separate heater, whether the refrigeration coil is used or not.

Operation of a cooling system of the present invention may be explained to advantage by reference to the charts shown in FIGS. 5 through 7. But first let us look at the mechanics of operation. Looking at FIG. 1, part of the air passing through the water-cooled coil 32 is delivered upwardly through the tower and thence vented to atmosphere; and the balance of this air is delivered to the room. While there may be variations in the proportions of air delivered to these two locations, in general the best balance and best over-all results are obtained if about one-third of the incoming air is delivered to the tower and two-thirds to the room. I have, however, obtained fairly good over-all results by delivering as little as twenty-five percent or as much as fifty percent of the incoming air to the tower, although as noted a division of one-third and two-thirds to the tower and room respectively, particularly when there is no re-circulation, provides the best over-all results.

It will be noted that the entire unit of FIG. 1 which, normally, will be placed outside the house is divided into three sections; namely, the tower proper containing the evaporative pads standing on end in the manner shown, and the chamber 14 which is again divided into upper and lower portions by the transverse false bottom forming a part of the sump arrangement. This entire container comprising the three vertically disposed compartments may be referred to as a chiller, as a chilling and cooling operation occurs in the entire area, and in this connection both the chilled water circuit and the air circuit must be considered.

Water from the water-cooled finned cooling coil 13, which has absorbed the maximum amount of heat from the incoming air because of the counter-current movement with respect to air and water, is delivered to the top of the tower and sprayed uniformly above the pads 23. The riser 33 may be on the outside of the housing defining the chiller, because at this time the water is at its highest temperature, and this may be near the ambient temperature. While I show a single spray 34, I may, for example, use several so-called square pattern solid core nozzles for uniform distribution of the water to the top surface. The sprayed water seeps down through the cooling pads, the vertical depth of which, for example, may be thirty-six inches or less. The water moves in the opposite direction to air which is at the same time rising in the tower. The water acquires its lowest temperature at the bottom of the tower, at which time it drips onto the false bottom and is directed into the sump assembly 16. At this location the water is actually within the chiller and in the direct path of part of the air discharged from the finned cooling coil 13. For the most part the pipes carrying fully chilled water are used within the chiller, or are insulated so that there is the minimum pick-up of extraneous heat. The water at its minimum temperature is delivered from the sump directly to the water-cooled finned cooling coil where it continues to move in counter-current heat exchanger relation with the incoming air. This completes the water circuit of the chiller but, as has been pointed out, the make-up water for the evaporative pad assembly 19 is from the discharge line of pump 29 to the separate sump 43, and the sump 43 is within the chiller so that the make-up water delivered to the evaporative pad 19 is always at substantially the minimum temperature of the water system. I have already pointed out that the make-up water for the tower at no time enters the body of the chiller, but is delivered to the top of the tower where the tower air and water are at their maximum temperature.

In the system of FIG. 1 there is no re-circulation of air, but what may be called the "air circuit" is a single step movement of air through the system and into the room in a special path and with special results not heretofore known. All of the hot outdoor air passes through the water-cooled finned cooling coil 13 in a counter-current heat exchange relation with the water movement. This air all enters the chamber 14 and, assuming the introduction of one hundred and fifty units of air into such chamber 14, optionally fifty units thereof would be directed upwardly through the tower and one hundred units or two-thirds of the incoming air through the evaporative pad 19. As the air moves upwardly through the tower it passes in a counter-current flow relation with the water which is seeping downwardly. In actual practice I have found that this upward-moving air follows a line of about ninety-five percent relative humidity on a psychrometric chart as it passes up through the tower, attaining virtual saturation at the top of the tower. This relationship indicates a continuous evaporation of some water throughout the height of the tower which is obviously maintained by the heat obtained from the water as it seeps downwardly. The water is thus cooled and the temperature to which it cools may approach to within five to ten degrees of the wet bulb temperature of the air leaving the water-cooled finned cooling coil and entering the chamber 14. It should be understood and will be pointed out later that the wet bulb temperature of the air leaving the finned cooling coil 13 is much below the ambient outdoor wet bulb temperature in ordinary operation. Thus it may be seen that I accomplish a regenerative effect in cooling the air to a dry bulb temperature well below the wet bulb temperature of the outdoor ambient air, and approaching the dry bulb temperature of air passing from a cooling coil of the standard well-functioning refrigeration installation. This regenerative effect is due to the operation of the system and is explained by reference to two specific relationships. As the wet bulb temperature of the air leaving the finned cooling coil is reduced the temperature of the water leaving the tower is reduced, so also as the temperature of the water leaving the tower is reduced the wet bulb temperature of the air leaving the cooling coil is reduced.

The approximate two-thirds of the air entering the chamber 14 and cooled by the finned cooling coil 13 which does not move upwardly through the tower passes into the room through an evaporative cooler comprising the evaporative pad assembly 19. Here it is further cooled adiabatically because the cooling effect on the air in passing the finned cooling coil 13 and through the chamber 14 has substantially no effect in the introduction of moisture, although to be sure the total moisture in the outside air remains the same and the relative humidity will be somewhat raised. This air, however, is still well above its wet bulb temperature, and, of course, as in the air passing upwardly through the tower, the wet bulb temperature of the cooled air has also been lowered with respect to the wet bulb temperature of the outside air.

The operation of the system of FIG. 1 may be further understood by reference to FIG. 5. Here the point 101 identifies a condition of the ambient or outside air, and this shows a dry bulb temperature of one hundred and five and a wet bulb temperature of approximately sixtyeight. Point 102 identifies the air entering the chamber 14. It will be noted that this air then has a dry bulb temperature of about seventy and a wet bulb temperature of about fifty-six or slightly above. The wet bulb temperature, therefore, is about twelve degrees below the wet bulb temperature of the outside air. The point 103 identifies the characteristics of the air as it enters the room and after it has passed the vaporative cooling pad 19. It will be noted that the air entering the room has a dry bulb temperature of around fifty-eight and a wet bulb temperature of around fifty-seven. This may be contrasted with air of the same initial make-up passing through an ordinary evaporative cooler which, when the cooler is functioning well, is probably of the order of seventy-two to seventy-eight degrees dry bulb. The lines connecting points 101, 102 and 103 represent changing conditions of the air as it moves through the system and out into the room. While the air discharging from the room through partially open windows, as is done with ordinary evaporative coolers and would be done with the system of FIG. 1, the temperature of the air leaving the room will vary depending, of course, upon the total space being cooled, the occupants and their activities, the volume of the air circulated, and other factors. In general, however, employing the system of FIG. 1, the condition of the air leaving the room is identified generally by the point comprising the reference character 104. Here the wet bulb temperature has risen to about sixty-seven, indicating additional moisture content in the air, and the dry bulb temperature has risen to about seventy-eight which may, as pointed out, be the equivalent of the temperature of the air entering the room with the ordinary evaporative system.

The line 106 on the psychrometric chart comprising FIG. 5 identifies the changing characteristics of the air entering the tower at the point 102 and moving upwardly and discharging through the top of the tower at, for example, the point 107. As line 106 shows, there is an immediate increase of wet bulb temperature as moisture is picked up with some slight reduction in dry bulb temperature, followed by a later gradual increase in dry bulb temperature as heat is extracted from the water dripping downwardly through the tower. For a substantial period of time, however, the line 106 follows closely along the ninety percent relative humidity line, gradually moving over toward increased humidity of the order of approximately ninety-five percent or higher. These figures indicate that the air moving upwardly in the tower continuously absorbs heat from the water. This relationship is also indicated by the water line 108 drawn along the line of one hundred percent relative humidity for convenience and showing a lowermost temperature of sixty-five degrees at point 109, and an upper temperature of eighty-nine degrees at point 111. It will be noted from these figures that the temperature of the chilled water is very much lower than can normally be obtained in the regular cooling tower when ambient air is brought into contact with the water as it moves through a heat exchanger of the type generally employed in water towers. This is another indication of the regenerative effect previously referred to in which the cooled water produces cooler air and the cooled air produces cooler water until an equilibrium is established at which both the air and water are very much cooler than they are in the normal system.

The system shown in FIG. 4 functions in the same general manner as the system of FIG. 1 with, of course, certain modifications in results caused by the introduction of the principle of air re-circulation and the introduction of a refrigerant cooled finned air cooling coil at the point where the evaporative pad is employed in the FIG. 1 embodiment.

In the chart comprising FIG. 6 the point 112 identifies, the return room air as it passes into contact with the blower 56, where it is mixed with outside air identified by the point 113. The mixture of outside air and room air delivered to the blower 56 is identified by the point 114. The air entering the chamber 61 is identified by the point 116. The line 117 represents the path of the air as it is cooling in the water coil along a constant dew point line, and the line 118 represents the air being discharged from the chamber 61 into the room, it being assumed that in this case no refrigerant is being delivered to the coil 77. In this case, as in the previous case, approximately one-third of the air leaving the water-cooled finned water cooling coil is delivered through to the tower, and its path is indicated by the line 119. The point 121 indicates a typical highest temperature for the tower air under the conditions postulated. The water in the system may be reduced in temperature to the point 122 and raised in temperature to the point 123. It will be noted that the general shape of the line 119 is the same as line 106 shown in FIG. 5 with a slight displacement to the left along approximately the ninety-five percent relative humidity line. In FIG. 7 I illustrate temperature and humidity characteristics when the refrigerating coil 77 is in use, required, for example, because of the existence of a heavier load on the system or more adverse out-door conditions. In this chart the condition of the ambient air is indicated by the point 126, and of the room by the point 127. The point 128 indicates the condition of the mixed air, and the point 129 the condition of the air after it passes the water-cooled finned cooling coil 62 and enters the chamber 61. The point 131 identifies the condition of the air at a point within the refrigeration coil 77. This indicates that the air at this point reaches saturation and that condensation begins, thus removing some of the humidity from the room. The point 132 represents the condition of the air passing into the room from the refrigeration coil, and this shows both a wet bulb and dry bulb temperature of fifty degrees. This, of course, is illustrative but typical. In this case also approximately one-third of the air passing the finned cooling coil 62 moves upwardly through the tower along the line 133 to a maximum temperature at approximately 134, or approximately eighty-one degrees. The line 133 follows the same general configuration as the similar lines in FIGS. 5 and 6. Points 136 and 137 represent approximately the upper and lower temperatures respectively of the water at the top of the tower and entering the finned cooling coil.

In the discussion of FIG. 3 hereinabove reference was made to certain advantages of the U-shaped coil. It may be noted at this point that the use of this particular type of coil in the FIG. 1 system and in the FIG. 4 system accounts at least in part for the results obtained as shown by the charts, although the invention may embody any type of coil which will give the same general results. The U-shaped coil not only saves space by being wrapped around the fan or blower, but it makes possible the use of a higher ratio of coil length to coil height. There are features involved in the practice of the present invention known to have the effect of introducing two mutually antagonistic factors so far as optimum design is concerned.

It is well known that cooling coils become more efficient as the velocity of water flowing through them increases, and in systems involving the use of water-cooled finned cooling coils it is a common practice to employ a relatively large reservoir and separate water-cooling mechanism, so that a plentiful supply of cool to cold water will always be available to the coil for maximum efficiency. It is also well-known, however, that as the temperature of the water leaving the cooling tower approaches the wet bulb temperature, the temperature of the water leaving the cooling coil is decreased as the velocity of water flowing through the coil increases beyond a pre-determined point, other things being equal. In the present invention, unlike the case of the conventional cooling tower, it is necessary to cool only a small amount of water to a low temperature instead of only partially cooling a lot of water. One of the desirable functions of the present invention is to provide the maximum temperature drop for the air passing through the finned water-cooled cooling coil, and the closer the temperature of the effluent air is to the incoming water the greater the efficiency of the unit. As shown by FIG. 5 the temperature of the water entering the cooling coil, is sixty-five degrees, and the temperature of the air leaving the cooling coil is seventy degrees dry bulb and about fifty-seven wet bulb. A similar relationship is shown in FIG. 6. Since it is impossible to move the water faster through a given coil without increasing the amount of water passing downwardly through the tower, the only way of obtaining increased water movement is to alter the shape of the coil while retaining the same face area. The use of the U shape permits increasing the length of the coil compared with its height by producing a coil twice as long and half as wide and wrapping it around in the general manner shown, then the same amount of water per second passes through the longer coil but the velocity is twice as great and the heat transfer characteristics are much improved. As a matter of fact, the improvement approaches one hundred percent increased efficiency.

The system of my invention may be controlled by the utilization of standard control equipment, none of which is indicated on the drawings. In the system comprising FIG. 1 illustrated by the chart of FIG. 5, for example, a two-stage thermostat may be employed, the upper stage of which will turn off the water to the evaporative pad comprising assembly 19, and the lower of which turns off the blower 10 or reduces its speed. In the FIG. 4 system operated for cooling as in FIG. 7, the first stage of the control can de-activate the refrigeration system, and the second stage control the blower 56. Usual provisions may, of course, be made to convert from heating to cooling and, as in all systems, manual control or automatic control of any parts of the system such as air flow, water circulation and the like may be utilized.

I have described my invention in considerable detail so that those skilled in the art may understand the same, but the scope of the invention is defined by the claims.

1. Air conditioning apparatus of the character described, comprising:
   (a) a chamber;
   (b) a tower above said chamber;
   (c) an air inlet connecting said chamber with outside ambient air;
   (d) air outlets connecting said chamber with space to be cooled and with said tower;
   (e) blower means drawing air from the outside and delivering the same to said chamber;
   (f) control means passing a major portion of said air from the chamber to said space to be cooled and a minor portion to the tower;
   (g) a water-cooled air cooling coil in the path of air entering said chamber;
   (h) means for delivering water from said air cooling coil uniformly to a top portion of the tower to permit its movement by gravity in a direction opposite to that of the air rising in the tower to cool the said water,
   (i) means for delivering a portion of said cooled water under pressure to said air cooling coil, whereby said air entering the said space may have a wet bulb temperature lower than the wet bulb temperature of outside ambient air,
   (j) an evaporative cooler in said chamber outlet to said space to be cooled,
   (k) and means for delivering a portion of said cooled water under pressure to said evaporative cooler.

2. Air conditioning apparatus as defined in claim 1 including:
   (a) means for re-circulating a portion of the air in said cooled space and mixing the same with the outside air;
   (b) moving said mixed air past said water-cooled air cooling coil,
   (c) said mixture of air so cooled then passing in major portion to said chamber and in minor portion to said tower.

3. Air conditioning apparatus as defined in claim 1 wherein:
   (a) said water-cooled air cooling coil is both multi-tiered and U-shaped and extends partly around three sides of said blower means to provide relatively great length-to-height ratio and permit relatively rapid movement of water through the said coil without increasing the total amount of water delivered to said tower.

4. Air conditioning apparatus of the character described, comprising
   (a) a chamber,
   (b) a tower above said chamber,
   (c) an air inlet connecting chamber with outside ambient air,
   (d) air outlets connecting said chamber with space to be cooled and with said tower,
   (e) blower means drawing air from the outside and delivering the same to said chamber,
   (f) control means passing a major portion of said air from the chamber to said space to be cooled and a minor portion to said tower,
   (g) a water-cooled air cooling coil in the path of air entering said chamber,
   (h) means for delivering water from said air cooling coil uniformly to a top portion of the tower to permit its movement by gravity in a direction opposite to that of the air rising in the tower to cool the said water,
   (i) means for delivering said cooled water under pressure to said air cooling coil, whereby said air entering the said space may have a wet bulb temperature lower than the wet bulb temperature of outside ambient air, and
   (j) an evaporative pad assembly providing a source of water vapor in the path of the air entering the said space to cool the same adiabatically to a dry bulb temperature below the wet bulb temperature of said outside air,
   (k) and the means connecting said cooled water delivering means to said source of water vapor for the supply of make-up water thereto.

5. Air conditioning apparatus of the character described, comprising
   (a) means forming a chamber having air inlet and air outlet passageways,
   (b) a water-cooled finned cooling coil disposed at said inlet passageway,
   (c) a cold water sump assembly in said chamber dividing said chamber into two generally vertically disposed portions,
   (d) a water cooling tower above said chamber and having an open bottom communicating with the upper portion of said chamber,
   (e) means for withdrawing cold water from said sump and delivering the same under pressure to said finned cooling coil,
   (f) means for delivering water from said finned cooling coil to a top portion of said tower when it has passed through said coil and extracted heat from the said air entering the chamber,
   (g) means, including a water level control valve in said sump, for introducing make-up water into the system at the top of the tower,
   (h) means causing a major portion of the air entering the chamber to be discharged through said outlet passageway for cooling a room or the like, and
   (i) means for causing a minor proportion of the air entering the chamber to be delivered upwardly through said tower, said water being cooled in its downward path through the tower by said upwardly moving air, whereby to obtain a regenerative effect of reducing air temperature as water temperature is reduced and reducing water temperature as air temperature is reduced until an equilibrium is established in which the wet bulb temperature of the air entering the chamber is substantially below the wet bulb temperature of outside ambient air.

6. Air conditioning apparatus of the character described, comprising
   (a) means forming a chamber having air inlet and air outlet passageways,
   (b) a water-cooled finned cooling coil disposed at said inlet passageway,
   (c) a cold water sump assembly in said chamber dividing said chamber into two generally vertically disposed portions,
   (d) a water cooling tower above said chamber and having an open bottom communicating with the upper portion of said chamber,
   (e) means for withdrawing cold water from said sump and delivering the same under pressure to said finned cooling coil,
   (f) means for delivering water from said finned cooling coil to a top portion of said tower when it has passed through said coil and extracted heat from the said air entering the chamber,
   (g) means causing a major portion of the air entering the chamber to be discharged through said outlet passageway for cooling a room or the like,
   (h) means for causing a minor proportion of the air entering the chamber to be delivered upwardly through said tower, said water being cooled in its downward path through the tower by said upwardly moving air, whereby to obtain a regenerative effect of reducing air temperature as water temperature is reduced and reducing water temperature as air temperature is reduced until an equilibrium is established in which the wet bulb temperature of the air entering the chamber is substantially below the wet bulb temperature of outside ambient air,
   (i) evaporative pad means supported in said chamber outlet passageway, and
   (j) means for delivering water to said evaporative pad, whereby adiabatically to cool the air entering the said space or the like to a dry bulb temperature below the wet bulb temperature of the outside ambient air.

7. Apparatus as defined in claim 6, wherein
   (a) said water delivery means includes a separate second sump into which unevaporated water from the evaporative pad is drained,
   (b) pump means for withdrawing water from said second sump and delivering it to the evaporative pad, and
   (c) means for withdrawing cold make-up water from said first-mentioned sump.

8. Air conditioning apparatus of the character described, comprising
   (a) means forming a chamber having air inlet and air outlet passageways,
   (b) a water-cooled finned cooling coil disposed at said inlet passageway,
   (c) a cold water sump assembly in said chamber dividing said chamber into two generally vertically disposed portions,
   (d) a water cooling tower above said chamber and having an open bottom communicating with the upper portion of said chamber,
   (e) means for withdrawing cold water from said sump and delivering the same under pressure to said finned cooling coil,
   (f) means for delivering water from said finned cooling coil to a top portion of said tower when it has passed through said coil and extracted heat from the said air entering the chamber,
   (g) means causing a major portion of the air entering the chamber to be discharged through said outlet passageway for cooling a room or the like,
   (h) means for causing a minor proportion of the air entering the chamber to be delivered upwardly through said tower, said water being cooled in its downward path through the tower by said upwardly moving air, whereby to obtain a regenerative effect of reducing air temperature as water temperature is reduced and reducing water temperature as air temperature is reduced until an equilibrium is established in which the wet bulb temperature of the air entering the chamber is substantially below the wet bulb temperature of outside ambient air, and
   (i) means for withdrawing a portion of said room air and delivering the same to said chamber through said water-cooled finned cooling coil along with said outside air.

9. Air conditioning apparatus of the character described, comprising
   (a) means forming a chamber having air inlet and air outlet passageways,
   (b) a water-cooled finned cooling coil disposed at said inlet passageway,
   (c) a cold water sump assembly in said chamber dividing said chamber into two generally vertically disposed portions,
   (d) a water cooling tower above said chamber and having an open bottom communicating with the upper portion of said chamber,
   (e) means for withdrawing cold water from said sump and delivering the same under pressure to said finned cooling coil,
   (f) means for delivering water from said finned cooling coil to a top portion of said tower when it has passed through said coil and extracted heat from the said air entering the chamber,
   (g) means causing a major portion of the air entering the chamber to be discharged through said outlet passageway for cooling a room or the like,
   (h) means for causing a minor proportion of the air entering the chamber to be delivered upwardly through said tower, said water being cooled in its downward path through the tower by said upwardly moving air, whereby to obtain a regenerative effect of reducing air temperature as water temperature is reduced and reducing water temperature as air temperature is reduced until an equilibrium is established in which the wet bulb temperature of the air entering the chamber is substantially below the wet bulb temperature of outside ambient air, and
   (i) a refrigerant-cooled coil in said outlet passageway of the character and for the purpose described.

References Cited in the file of this patent

UNITED STATES PATENTS

| | | |
|---|---|---|
| 1,863,579 | Morse | June 21, 1932 |
| 2,069,359 | Dudley | Feb. 2, 1937 |
| 2,071,509 | Dudley | Feb. 23, 1937 |
| 2,152,251 | Gay | Mar. 28, 1939 |
| 2,211,886 | Dudley | Aug. 20, 1940 |
| 2,629,587 | Tignor | Feb. 24, 1953 |